(12) United States Patent
Consolaro

(10) Patent No.: US 10,315,788 B2
(45) Date of Patent: Jun. 11, 2019

(54) CLOSURE SYSTEM FOR CONTAINERS AND RELATED CONTAINER AND PROCESS FOR THE REALIZATION

(71) Applicant: BREVETTI ANGELA S.R.L., Arzignano (IT)

(72) Inventor: Roberto Consolaro, Arzignano (IT)

(73) Assignee: BREVETTI ANGELA S.R.L., Arzignano (IT)

( * ) Notice: Subject to any disclaimer, the term of this patent is extended or adjusted under 35 U.S.C. 154(b) by 626 days.

(21) Appl. No.: 14/856,243

(22) Filed: Sep. 16, 2015

(65) Prior Publication Data

US 2016/0075455 A1 Mar. 17, 2016

(30) Foreign Application Priority Data

Sep. 16, 2014 (IT) .............................. VI2014A0237

(51) Int. Cl.
 *B65B 7/28* (2006.01)
 *B29C 49/04* (2006.01)
 (Continued)

(52) U.S. Cl.
 CPC ............ *B65B 7/2835* (2013.01); *B29C 49/04* (2013.01); *B29C 49/20* (2013.01); *B65B 3/022* (2013.01);
 (Continued)

(58) Field of Classification Search
 CPC .... B29C 2049/2017; B29C 2049/2026; B29C 2049/2043; B29C 2049/2047; B29K 2101/12; B29L 2031/565; B65B 7/2835
 (Continued)

(56) References Cited

U.S. PATENT DOCUMENTS 4,901,873 A * 2/1990 Weiler ................. B29C 66/542
215/251
5,649,637 A * 7/1997 Weiler ................ B29C 49/4817
215/251
(Continued)

FOREIGN PATENT DOCUMENTS

CN 1121031 A 4/1996
CN 101115458 A 1/2008
(Continued)

OTHER PUBLICATIONS

May 13, 2015 Search Report issued in Italian Patent Application No. VI20140237.
(Continued)

Primary Examiner — Robert F Long
Assistant Examiner — Xavier A Madison
(74) Attorney, Agent, or Firm — Arent Fox LLP

(57) ABSTRACT

A closure system and method of forming containers comprising a closing element. The closing element is integrally sealable to the container at one of the openings to be closed, and a preferential separation zone between the container and the closing element, the closure system comprising a first guiding and/or coupling portion for guiding and controlling the movement of the closing element from a first blocking position, wherein the closing element is integral to the container, to a second unblocking position, wherein the closing element is separated from the container via the preferential separation zone. The closure system further includes a first thread on the insert and a second thread formed within the closing element.

10 Claims, 4 Drawing Sheets

(51) Int. Cl.
  *B29C 49/20* (2006.01)
  *B65B 3/02* (2006.01)
  *B29K 101/12* (2006.01)
  *B29L 31/56* (2006.01)
(52) U.S. Cl.
  CPC .............. *B29C 2049/2017* (2013.01); *B29C 2049/2026* (2013.01); *B29C 2049/2043* (2013.01); *B29C 2049/2047* (2013.01); *B29K 2101/12* (2013.01); *B29L 2031/565* (2013.01)
(58) Field of Classification Search
  USPC .......................................................... 53/452
  See application file for complete search history.

(56) References Cited

U.S. PATENT DOCUMENTS

| | | | | |
|---|---|---|---|---|
| 5,687,550 | A | * | 11/1997 | Hansen ................. A61M 5/282 53/140 |
| 5,740,931 | A | | 4/1998 | Weiler |
| 5,833,058 | A | | 11/1998 | Mabry |
| 5,883,085 | A | | 3/1999 | Blank et al. |
| 2009/0200191 | A1 | | 8/2009 | Matsuda et al. |

FOREIGN PATENT DOCUMENTS

| | | |
|---|---|---|
| CN | 102164830 A | 8/2011 |
| JP | S58-73537 A | 5/1983 |
| JP | S61-266214 A | 11/1986 |
| JP | H08-58815 A | 3/1996 |
| WO | WO 2010/143219 A2 | 12/2010 |
| WO | WO 2011/001456 A2 | 1/2011 |

OTHER PUBLICATIONS

Chinese Office Action dated Mar. 20, 2017 issued in Chinese Patent Application No. 201510585026.1 (with English translation).
Bini et al., 1997. Protein expression profiles in human breast ductal carcinoma and histologically normal tissue. Electrophoresis. 18:2831-2841.
Chinese First Office Action dated Jul. 29, 2013 issued in Chinese Patent Application No. 201180013649.1 (with translation).
Chinese Second Office Action dated Mar. 20, 2014 issued in Chinese Patent Application No. 201180013649.1 (with translation).
Chinese Third Office Action dated Oct. 24, 2014 issued in Chinese Patent Application No. 201180013649.1.
De Angelis et al., 2005. Biochim. Biophys. Acta. 1762:80-93.
Di Cagno et al., "Molecular adaptation of source Lactobacillus plantarum DC400 under co-cultivation with other lactobacilli", Research in Microbiology, vol. 160, pp. 358-366 (2009).
Di Cagno et al., 2007. Cell-cell communication in sourdough lactic acid bacteria: a protomic study in Lactobacillus sanfranciscensis CB1. Proteomics 7:2430-2446.
Di Cagno et al., 2009. Synthesis of γ-amino butyric acid (GABA) by Lactobacillus plantarum DSMZ19463: functional grape must beverage and dermatological application. Appl Biotechnol Microbiol DOI: 10.1007/s00253-009-23704.
Di Cagno et al., 2010. Quorum sensing in sourdough Lactobacillus plantarum DC400 (DSM 23213): induction of plantaricin A (PlnA) under co-cultivation with other lactic acid bacteria and effect of PlnA on bacterial and Caco-2 cells. Proteomics in press.
Diep et al., 1994. The gene encoding plantaricin A, a bacteriocin from Lactobacillus plantarum C11, is located on the same transcription unit as an agr-like regulatory system. Appl Environ Microbiol 60:160-166.
European First Office Action dated Dec. 2, 2013 issued in European Patent Application No. 11 709 193.4.
European Second Office Action dated Jul. 31, 2015 issued in European Patent Application No. 11 709 193.4.
Fujiya et al., 2007. The Bacillus subtilis quorum-sensing molecule CSF contributes to intestinal homeostasis via OCTN2, a host cell membrane transporter. Cell Host Microbe 1:299-308.
Gobbetti, 1998. The sourdough microflora: interactions of lactic acid bacteria and sourdoughs. Trends Food Sci Technol 9:267-274.
Hauge et al., 1998. Plantaricin A is an ampkiphilic alpha-helical bacteriocin-like pheromone which exerts antimicrobial and pheromone activities through different mechanisms. Biochemistry 37:16026-16032.
Italian Search Report dated Feb. 10, 2012 issued in Italian Patent Application No. RM20110330.
Italian Search Report dated Jul. 23, 2010 issued in Italian Patent Application No. RM20100004.
Japanese Office Action dated Jan. 26, 2015 issued in Japanese Patent Application No. 2012-548540.
Maldonado et al., 2004. Production of plantaricin NC8 by Lactobacillus plantarum NC8 is induced in the presence of different types of Gram-positive bacteria. Arch Microbiol 181: 8-16.
Mexican First Office Action dated Mar. 2, 2015 issued in Mexican Patent Application No. MX/E/2012/051982 (with translation).
Nakajama et al., 2001. Gelatinase biosynthesis-activating pheromone: a peptide lactone that mediates a quorum sensing in Enterococcus faecalis. Mol Microbiol 41: 145-154.
Russian First Office Action dated Oct. 2, 2014 issued in Russian Patent Application No. 2012134407/10(054967) (with translation).
Russian Second Office Action dated Apr. 7, 2015 issued in Russian Patent Application No. 2012134407 (with translation).
Sturme et al., 2007. Making sense of quorum sensing in lactobacilli: a special focus on Lactobacillus plantarum WCFA1. Microbilogy 153: 3939-3947.
Xavier et al., 2003. LuxS quorum sensing: more than just a numbers game. Curr Opin Microbiol 6: 191-197).
Zwietering et al., 1990. Modelling of bacterial growth curve. Appl Environ Microbiol 56: 1875-1881.

\* cited by examiner

CLOSURE SYSTEM FOR CONTAINERS AND RELATED CONTAINER AND PROCESS FOR THE REALIZATION

CROSS-REFERENCE TO RELATED APPLICATION

This application is based upon and claims the benefit of priority to Italian Patent Application No. VI2014A000237, filed Sep. 16, 2014. The disclosure of the prior application is hereby incorporated in its entirety by reference.

FIELD OF THE INVENTION

The present invention relates to a closure system for containers. In detail, the invention relates to a closure system for hermetically sealed containers.

BACKGROUND

The process for producing airtight containers, named BLOW FILL SEAL or BPS, is known, and comprises the step of forming the container (Blow), filling it (Fill) and hermetically closing it by sealing (Seal). According to this process, at first the body of the container is formed, then charged (or filled) with the desired liquid or solid filling, and then sealed.

The airtight closure (or seal: Seal step) occurs forming a cap or other closing element which is connected to the hollow body of the container and can be moved away by means of a region with a thinner section, with easy breakage.

As an example, pre-filled syringes are known, as an example like the ones described in document n. U.S. Pat. No. 5,740,931, comprising a main body, with an upper end, a neck portion integral with the main body at its upper end, a preformed closure insert which is fixed inside the neck, and an over-cap integral with the neck and removable from it.

In particular, the closure insert has a rough perimeter surface defined by axially aligned ribs uniformly spaced from one another and an axially extending passageway defined therethrough, while the overcap has a peripheral frangible web circumscribing it at the connection of the overcap with the neck portion, and it is realized so that the thermoplastic material is in intimate contact with the rough perimeter surface and wherein spaces between said ribs are filled by the thermoplastic material.

The aim of such ribs, parallel to the axis of the container, is to increase the points of contact between the hollow body and cap, blocking mutual rotation.

A kind of hermetic closure includes a cap to be applied for protecting the insert and the closing neck, so that the filling remains sterile until the moment of use, and having a breaking point defined by the notch, so as opening occurs quickly and easily. Such hermetic closure has the advantage of being easily openable by a user, so that he may access the liquid within the container. Nevertheless, said hermetic closure has the drawback of being scarcely resistant to shock during transport. Accordingly, said hermetic closure has the risk of accidental opening because of a collision, or of a sudden movement by a careless user.

Further, another drawback of said known closing system is in that it is opened without control, that is: exerting a force, in a single application, of short duration. This involves the possibility of opening the container too quickly, possibly while the container is tilted with respect to the vertical axis of the container, with the risk that the filling is released into the environment prior to its use. Furthermore, the force required for opening may vary depending on the thickness of the area to be broken.

As an alternative, it may happen that, performing a sudden movement for opening the container, the filling of the container, which had been isolated and hermetically closed just for not compromising its physical-chemical properties, could be contaminated by external agents carried by the air displacement due to said motion. In this way, the process of inserting and hermetically closing the filling within the container is useless and exceedingly laborious.

The need for a container allowing containing and preserving a substance remains, such container being easy to be opened by a user, but at the same time preserving safety in respect with the external contamination danger even at the opening moment.

SUMMARY OF THE INVENTION

The main aim of the invention is then to overcome the abovementioned drawbacks of the and to provide a closure system for a container that meets the requirements which are listed above.

In particular, aim of the invention is to realize a closure system for a container that guarantees the tightness and ease of opening, but at the same time avoids accidental opening of the container.

This task, as well as these and other purposes which will be apparent hereinafter, are achieved by a closure system and by a container comprising said system according to the attached independent claims, to which reference is made in full.

Features of detail of the closure of the system and its container according to the invention are set forth in the dependent claims, to which reference is made in full.

Advantageously the closure system of the invention makes safer the container to which it is applied, especially during the handling and the transport of the container, protecting the filling from any leakage or contamination.

A further advantage of the invention is in that the container is easier to open than the known containers.

The main subject matter of the invention is a closure system for containers, comprising a cap or closing element, integrally sealable with the container in correspondence of one of its openings to be closed, and a preferential separation zone between the container and the closing element; according to the invention the closure system comprises first guiding and/or coupling means for guiding and controlling the movement of the closing element from a first blocking position, wherein the closing element is integral to the container, to a second unblocking position, wherein the closing element is apart from the container in correspondence of the preferential separation zone.

According to the invention, the first guiding and/or coupling means comprise an insert displaceable in correspondence of the opening to be closed of the container, and provided with a set diameter and of a first thread, which will form a counterthread on the closing element corresponding to the first thread.

Always according to the invention, the insert may have different profiles, e. g. a conic profile or a cylindric profile.

Moreover, according to the invention, the insert may have an end element, having a diameter larger than the diameter of the insert.

Further, according to the invention, the preferential separation zone, between the container and the closing element, comprises an area of mechanical weakening.

Advantageously, said mechanical weakening or notch may be larger than the known system, since the separation may occur only with a guided movement.

In particular, even if the notch correspondes to a complete cut in the separation area, the cap would be anyway anchored to the hollow body. In other words: opening of the closure system may occur more easily, but at the same time it may not occur unintentionally.

Another aspect of the invention is a process for realizing a container, wherein the guiding and/or coupling means comprise a first thread placed on an insert, which is displaceable in correspondence of the opening to be closed of the container, and provided with a set diameter and with a thread that during the process will form, as a countermold, the second thread of the closing element, making the latter become, after opening, a reclosable cap.

Preferably, according to the invention, the following steps are provided:

extruding a tube of plastic material at the melting temperature of the plastic material;

inserting the tube in a mold comprising two halves for forming;

closing a first part of the tube, that will be the bottom part of the container, for forming the hollow body of the container and forming the thread;

blowing, and closing the second part or upper part of the container.

According to the invention, providing, after the step of venting and before the step of closing the container, a step of filling the container is possible. Further according to the invention, before the step of closing the second part or upper part of the container, the following step may occur:

inserting an insert, displaceable in correspondence of the opening to be closed of the container, and provided with a set diameter and of a first thread;

realizing a counterthread on the inner part of the container corresponding to the first thread.

Always according to the invention, the insert is used for thermoforming the thread, i. e. as countermold for shaping the molten plastic material between the insert and the mold, so as to realize on the closure element a second thread corresponding to the first thread.

Moreover, according to the invention, the step of inserting an insert within the container before the step of filling the container is possible.

BRIEF DESCRIPTION OF THE DRAWINGS

Further features and advantages of the invention will be as better apparent from the description of a preferred, but not exclusive embodiment of the closure system, and of the relative container according to the invention, which is illustrated for indicating and non-limiting aim, with the aid of tables of attached drawings, wherein.

Regarding the attached figures, the container of the invention, indicated with the reference number 10, is shown in a first of its embodiment, that is a medical device or container.

The container 10 of the figures comprises a closing element 1 for closing/protecting the hollow body 2, which may be filled with a liquid or medical drug.

DETAILED DESCRIPTION

Figure 1:
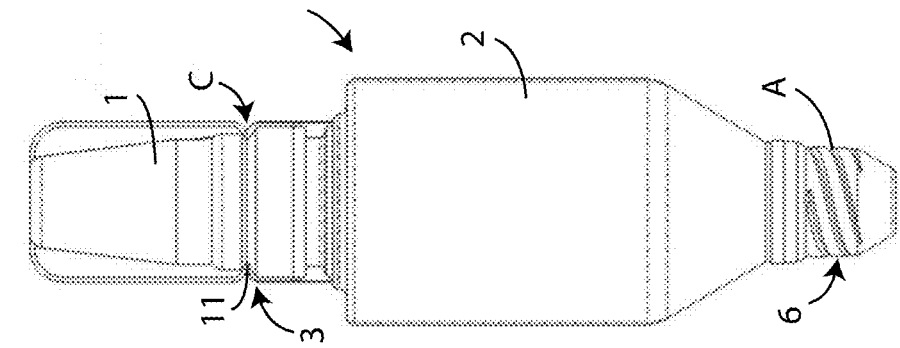
FIG. 1 shows in a front view a first embodiment of the container of the invention.
Figure 4:
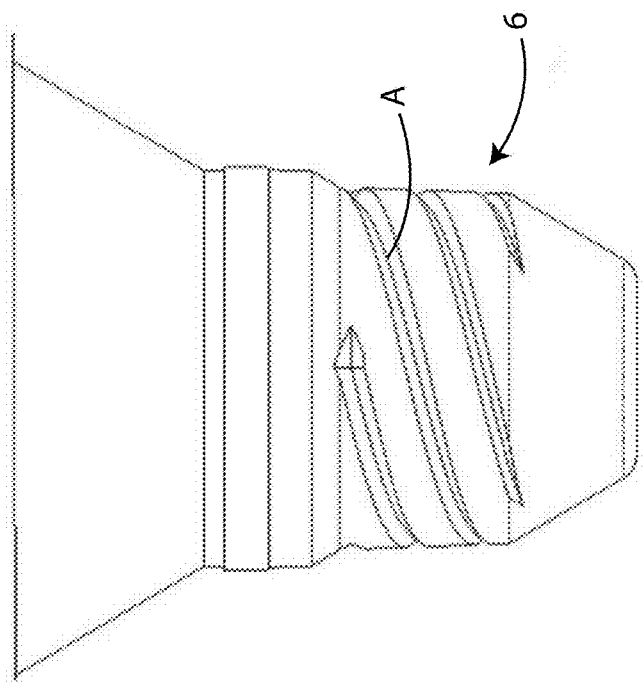
FIG. 4 shows a detail section of FIG. 1.

In FIG. 1 a container 10 closed is shown, with the closing element 1 still attached to the hollow body 2 in correspondence of its first end 3 by means of the closing system C providing a narrowing section or a notch, which weakens the mechanical strength of the body of the closing element 1, or which notches it until the body 2 is divided from the closing element 1, so as the user is able to tear it out from the hollow body 2 without the difficulty that would be there in the known system for not compromising the safety of the closure.

In the embodiment of FIGS. 1-5, the container 10 has a second end 6 of the hollow body, equipped with a first thread A corresponding to the internal thread 4 which is present in the closing element 1. In this way, tearing the closing element 1 out from hollow body 2, the closing element 1 may be used again. As an example, it is possible to use the closing element 1 as a protecting element for the second end 6 of the same hollow body 2.

Figure 6:
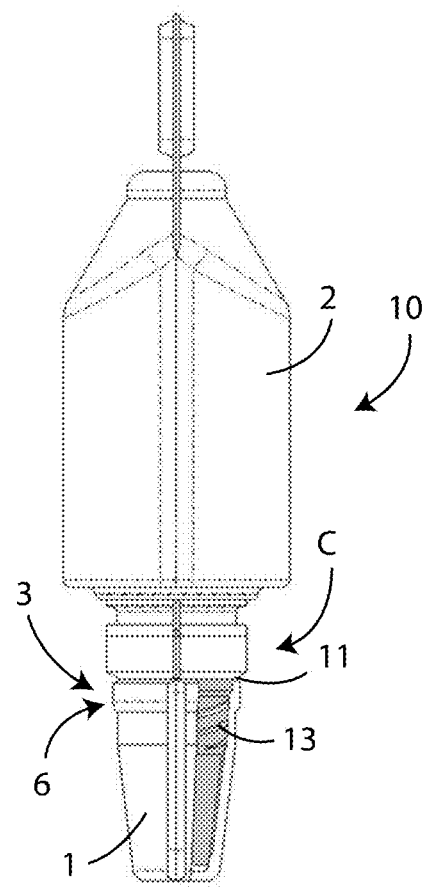
FIG. 6 shows a cross-section of a detail of a second embodiment of the container of the invention where the insert was applied before filling.
Figure 8:
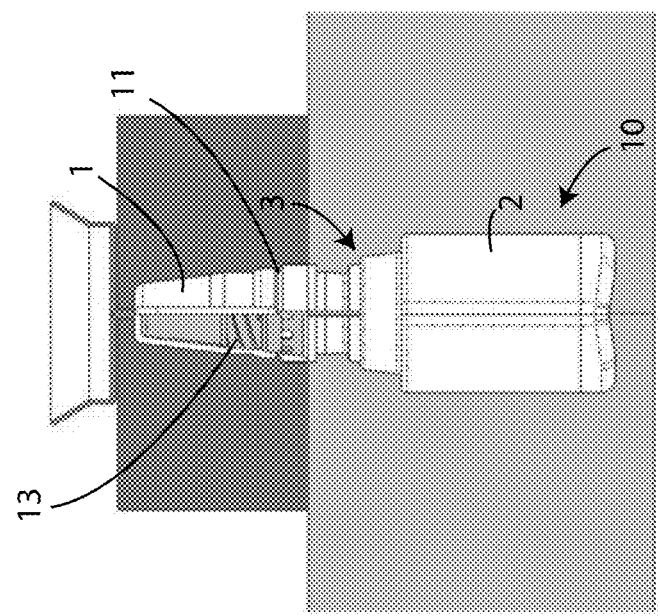
FIG. 8 shows the step of closing the upper mold with the molding of the thread on the lid in the container of FIG. 6.
Figure 7:
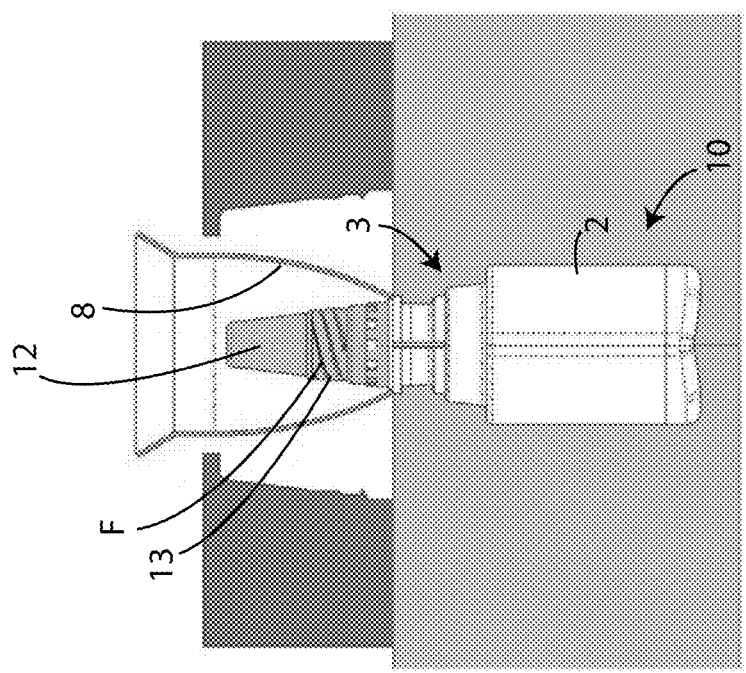
FIG. 7 shows the step of inserting the insert in the container of FIG. 6.

In particular, in any case, even in the embodiment shown in FIGS. 6 and 7, the closing element 1 is at first used for protecting the insert 12, so as the latter cannot be manipulated by a user when it is not the right moment to do that, nor the insert 12 may be hit unintentionally during transport, making the liquid, filling in the hollow body 2, leak. After it, the closing element 1 acts for example as a protecting element for the filling of the open hollow body (FIGS. 1 and 2).

Figure 2A:
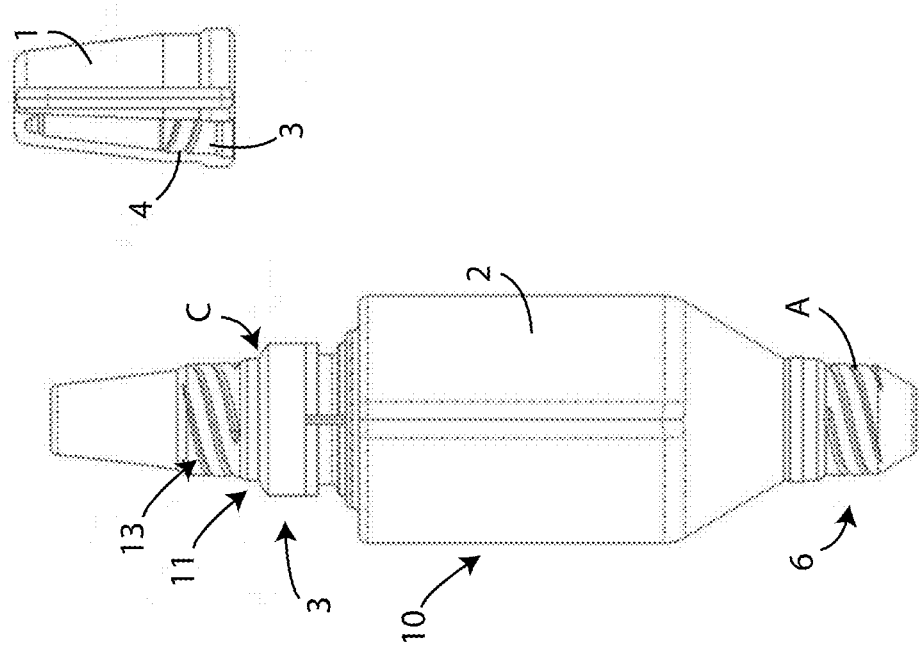
FIG. 2A shows a front view of the container of FIG. 1, without cap.
Figure 2:
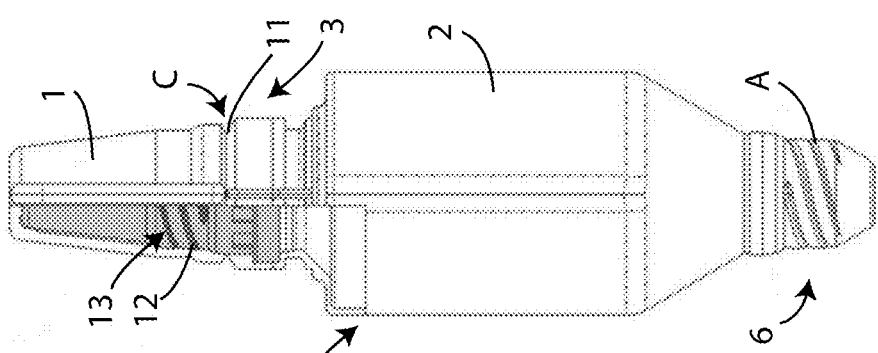
FIG. 2 shows a partial vertical section of the container of FIG. 1.

Observing FIG. 2A, we can see the internal structure 1 of the container 10, wherein the closure system C has the notch 11 and an insert 12, equipped also with a third thread 13, corresponding to the thread 4 created in the the closing element 1.

Figure 3:
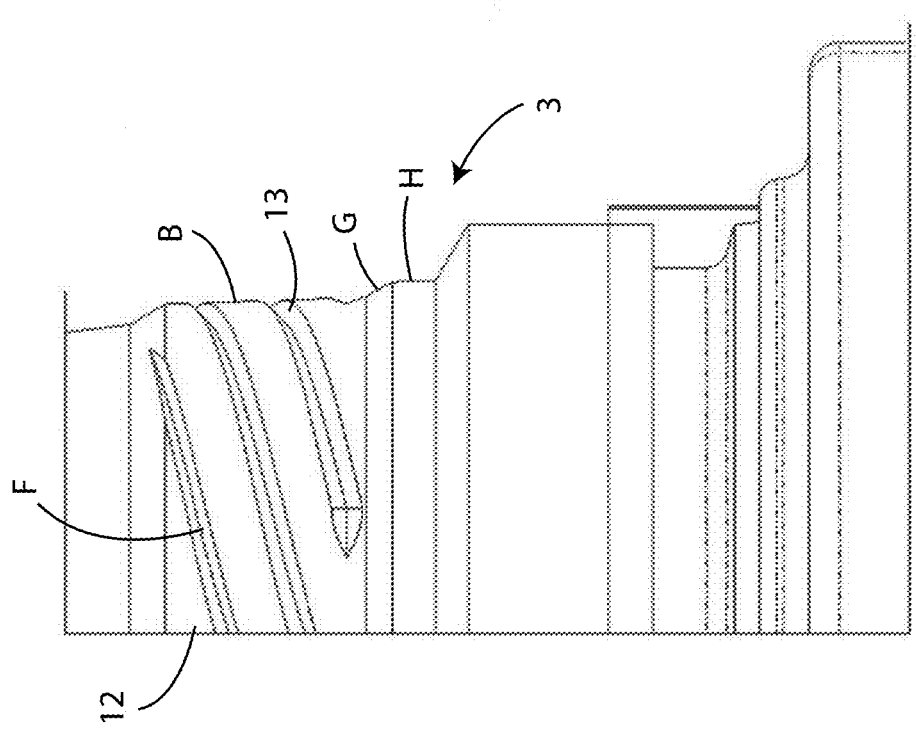
FIG. 3 shows a detail section of FIG. 1, wherein a first embodiment of the closure system of the invention is shown.
Figure 5:
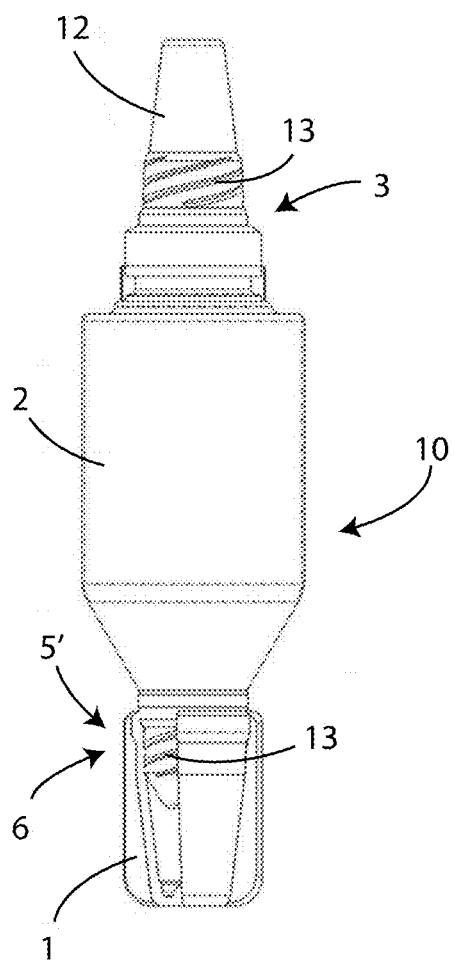
FIG. 5 shows a vertical section of the container of FIG. 1, with cap positioned as example for protecting the lower part of the container.

As can be better seen in FIGS. 3 and 7, the thread 4 (FIG. 2A) in the internal wall 3 is realized during the production, allowing forming in the closing element 1 a profile corresponding to the grooves F of the third thread 13, so as the two components of the container 10, that are the closing element 1 and the hollow body 2, can move away from each other by a twisting or unscrewing according to the direction of the thread 13.

Advantageously, the insert 12 or bush strengthens the area of notch 11 or thinning, preventing an accidental breakage due to a collision during transport or to a wrong movement of the user. In other words, the closure system C of the invention, thanks to the grooves F of the insert 12 in the area of notch C is able for preventing accidental openings.

In the preferred embodiment of FIGS. 1-5, to which reference was made above, the closing element 1 may be re-screwed also to the second end 6 of the hollow body.

In FIG. 3 a detail of the insert 12 is shown, wherein the grooves F of the thread 13 are visible. Preferably, the profile B of the insert 12 is conical. This advantageously makes opening of the container 10 easier.

Further, the insert 12 has an end element H, provided with a diameter, larger than the diameter of the remaining volume of the insert 12, forming a overhang G along the profile B. This advantageously makes easier the engagement of the closing element 1 in the step of re-closing (FIG. 3).

The thread 13 of the insert 12 may be also used when molding it on the cap adding step of the process disclosed in patent application WO 2007007178 by the Applicant, and named BFS (Blow-Fill-Seal). In particular, the BFS technology consists in extruding a tube of plastic material at a high temperature (the melting temperature of the same plastic material); in inserting it in a mold comprising two halves for forming; a first part of the tube, which will be the bottom part of the container, is closed for forming the hollow body of the container, while a second part of the tube, which will be the upper part of the container, remains open for allowing completing the following steps of the process. Advantageously, such following steps last few seconds, preventing the cooling of the plastic material from its melting temperature.

The following standard steps of the BFS process comprise the blowing, the venting, the filling and the closing of the second part or head (upper part) of the container.

According to the invention, before the closing the inserting of the insert 12 in correspondence of the closing point occurs, partially inside the hollow body.

The second part or upper part of the container is closed with an other mold in two halves for forming.

Advantageously, the insert 12 placed internally is used as countermold for shaping the molten plastic material 8 between insert 12 and mold.

Main aim of the process of the invention is forming a thread 4 during the forming of the upper part or closing element 1 of the container 10 using the thread of the insert 12.

The process as amended also enables us to eliminate the internal cap necessary in the containers of perishable material when in contact with external agents, such as a container for eye drops, but also of food products.

For example, this occurs in the case in which the container contains a large amount of a substance which shall not be consumed in a single application, but requiring prolonged use of the same, as in the case of an eye drop: the user can open the container 10 of the invention for the first time, exerting a twisting force around the closure element C. The rotary movement is guided by the grooves F of the thread 13 so as the closing element 1 moves away from the hollow body 2; the same thread 13 acts also as coupling element when it is wanted to close the container 10, re-screwing the closing element 1 to the hollow body 2.

Further, all the details can be replaced with other technologically equivalent elements.

In practice, the used materials, as well as the contingent shapes and dimensions, may vary depending on the contingent requirements and on the state of the art.

Where the constructing characteristics and the mentioned technologies in the following claims are followed by reference signs or numbers, such reference signs or numbers have been affixed with the only purpose of increasing the intellegibilty of the same claims and, consequently, they do not constitute in any way limitation to the interpretation of any element which was identified, by way of example only, by such reference signs or numbers.

The invention claimed is:

1. A process for forming a container equipped with a closure system, comprising:
    a closing element integrally sealable with at least one opening of the container, and a preferential separation zone between said container and said closing element, said closure system further comprising:
    first guiding or coupling portion for guiding and controlling the movement of the closing element from a first blocking position, wherein the closing element is integral with the container, to a second unblocking position, wherein the closing element is separated from the container via the separation zone, wherein the process of forming the container comprises:
    extruding a tube of plastic material at a melting temperature of the plastic material;
    inserting the tube in a mold comprising two halves for forming the container;
    closing a first part of the tube, for forming a hollow body of the container; and
    blowing, venting, and closing a second part of the container, wherein the guiding or coupling portion comprises a first thread on an insert placed within the container, in correspondence of the opening to close off the container, and equipped with a set diameter, said first thread acting as a countermold for forming and mating with a second thread on the closing element.

2. The process for forming a container according to claim 1, wherein, after the step of venting, and before the step of closing the container, the container is filled.

3. The process for forming a container according to claim 1, wherein, before the step of closing the second part of the container, the following step takes place:
    inserting the insert within the container in correspondence of the opening to close off the container, wherein the insert is equipped with the set diameter and with the first thread.

4. The process for forming a container according to claim 3, wherein the first thread of the insert is used as a countermold for shaping the closing element, putting some plastic material at the melting temperature of the plastic material between the insert and the mold, so as to form, on the closing element a second thread corresponding to the first thread.

5. The process for forming a container according to claim 3, wherein the step of inserting an insert within the container occurs before the step of filling the container.

6. A process for forming a filled container having a re-closable closing element, comprising:
    extruding a tube of plastic material at a melting temperature of the plastic material;
    inserting the extruded tube of plastic material into a mold comprising two halves;
    closing a first part of the tube;
    inflating the extruded tube of plastic within the mold to form an expanded portion of the extruded tube of plastic within the mold;
    providing an insert to a portion of the extruded tube of plastic, wherein the insert comprises a first thread; and
    forming the re-closable closing element between the insert and a second mold, wherein the re-closable closing element conforms to the mold and the first thread to form a second thread that mates with and is selectively engageable with the first thread.

7. The process for forming a container of claim 6, wherein the insert is provided to a portion of the extruded tube of plastic before the tube is inflated.

8. The process for forming a container of claim 6, wherein the insert is provided to a portion of the extruded tube of plastic after the tube is inflated.

9. The process for forming a container of claim 8, wherein, after the extruded tube of plastic is inflated, the expanded portion of the extruded tube is filled with a liquid.

10. The process for forming a container of claim 8, wherein the expanded portion of the extruded tube is filled with a liquid after the insert is provided.

\* \* \* \* \*